(12) United States Patent
Matsubara

(10) Patent No.: US 7,724,389 B2
(45) Date of Patent: May 25, 2010

(54) METHOD FOR PRINTING MIXED COLOR AND BLACK AND WHITE DOCUMENTS AND FOR RECOVERING FROM INTERRUPTIONS

(75) Inventor: Shigenori Matsubara, Irvine, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 828 days.

(21) Appl. No.: 11/540,109

(22) Filed: Sep. 28, 2006

(65) Prior Publication Data

US 2008/0079980 A1    Apr. 3, 2008

(51) Int. Cl.
G06K 15/00    (2006.01)
G03G 15/00    (2006.01)

(52) U.S. Cl. .................... 358/1.17; 358/1.16; 358/1.18; 399/20

(58) Field of Classification Search ................ 358/1.14, 358/1.15, 1.16, 1.17, 1.18, 1.9; 399/20, 364
See application file for complete search history.

(56) References Cited

U.S. PATENT DOCUMENTS

| | | | | |
|---|---|---|---|---|
| 4,573,789 A | * | 3/1986 | Wada | .......................... 399/364 |
| 5,030,991 A | * | 7/1991 | Zaitsu et al. | ................... 399/20 |
| 2002/0051176 A1 | * | 5/2002 | Kato | .......................... 358/1.15 |
| 2002/0097429 A1 | * | 7/2002 | Ferlitsch | ..................... 358/1.15 |
| 2004/0036908 A1 | * | 2/2004 | Yagita et al. | ................ 358/1.15 |

* cited by examiner

Primary Examiner—James A Thompson
(74) Attorney, Agent, or Firm—Chen Yoshimura LLP

(57) ABSTRACT

A method for recovering from an interruption while executing color split printing is described. The document is split into two sub-documents. N sets of the first sub-document are printed on a first printer, and N sets of the second sub-document are printed on a second printer while merging sheets of the first sub-document using a paper inserter unit. When an interruption occurs when printing and merging the $n^{th}$ set, the $n^{th}$ set is skipped and the remaining sets are finished first. Then, the second printer instructs the user to place the printed sheets of the $n^{th}$ set of the first sub-document starting from the first sheet after the point of interruption in the paper inserter unit. The second printer prints the $n^{th}$ set of the second sub-document starting from the point of interruption while merging sheets of the first sub-document using the paper inserter unit to complete the $n^{th}$ set.

14 Claims, 3 Drawing Sheets

METHOD FOR PRINTING MIXED COLOR AND BLACK AND WHITE DOCUMENTS AND FOR RECOVERING FROM INTERRUPTIONS

BACKGROUND OF THE INVENTION

1. Field of the Invention

This invention relates to a method and apparatus for managing a print shop system in which a plurality of printers are connected to and managed by a server. In particular, it relates to a method and apparatus for managing print jobs and printers in a print shop for printing documents that contain both color and black and white pages, and for recovering from an interruption when printing such jobs.

2. Description of Related Art

A professional print shop typically has a plurality of printers connected to a server by a network, where the server controls the printing of customer jobs on one or more printers. The printers in a print shop typically have different characteristics and capabilities. In particular, a print shop typically has both black and white printers and color printers. A conventional practice is to print documents containing only black and white pages (including gray level images) using black and white printers, and to print documents containing color pages using color printers. Printing with a color printer is typically more costly than printing with a black and white printer.

SUMMARY OF THE INVENTION

Many documents to be printed contain both color and black and white pages. Since color pages are more costly to print, it is desirable to separate a document into a color sub-document to be printed on a color printer and a black and white sub-document to be printed on a black and white printer, and merge the two sub-documents together, referred to as color split printing. When performing color split printing, interruptions such as paper jam, etc. may occasionally occur on either the color printer or the black and white printer or when the two sub-documents are merged. When an interruption occurs, printing should be resumed in a way to ensure that the two sub-documents are correctly printed and merged in the final document.

Accordingly, the present invention is directed to a method for managing print jobs that contain both black and white and color pages with the ability to quickly and efficiently recover from an interruption.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other objects, as embodied and broadly described, the present invention provides a method for printing N sets of a source document, N being a natural number, the source document having been split into a first sub-document and a second sub-document, the method including: (a) printing on a first printer N sets of the first sub-document; (b) placing printed sheets of the N sets of the first sub-document in a paper inserter unit of a second printer; (c) starting a printing process on the second printer to print N sets of the second sub-document while merging the sheets of the first sub-document in the paper inserter unit with printed sheets of the second sub-document according to a predetermined merging order; (d) when an interruption occurs in the printing step (c) during printing of an $n^{th}$ set of the second sub-document, n being a natural number and $n \leq N$, performing a recovery process including: (d1) removing from the second printer already printed and merged sheets of the $n^{th}$ set; (d2) removing from the paper inserter unit any remaining sheets of the $n^{th}$ set of the first sub-document; (d3) starting a printing process on the second printer to print N-n sets of the second sub-document while merging the sheets of the first sub-document in the paper inserter unit with printed sheets of the second sub-document according to the predetermined merging order; (d4) determining a point of interruption of the $n^{th}$ set; (d5) identifying a first sheet of the first sub-document after the point of interruption; (d6) placing printed sheets of the $n^{th}$ set of the first sub-document starting from the sheet identified in step (d5) in the paper inserter unit of the second printer; and (d7) starting a printing process on the second printer to print the $n^{th}$ set of the second sub-document starting from the point of interruption while merging the sheets of the $n^{th}$ set of the first sub-document in the paper inserter unit with printed sheets of the second sub-document according to the predetermined merging order.

In anther aspect, the present invention provides a method for producing N sets of a source document, N being a natural number, the source document having been split into a first sub-document and a second sub-document, the N sets of the first sub-document having been printed on a first printer, the method including: (a) displaying an instruction message for a user to place printed sheets of the N sets of the first sub-document in a paper inserter unit of a second printer; (b) starting a printing process on the second printer to print N sets of the second sub-document while merging the sheets of the first sub-document in the paper inserter unit with printed sheets of the second sub-document according to a predetermined merging order; (c) when an interruption occurs in the printing step (b) during printing of an $n^{th}$ set of the second sub-document, n being a natural number and $n \leq N$, performing a recovery process including: (c1) displaying an instruction message for the user to remove from the second printer already printed and merged sheets of the $n^{th}$ set; (c2) displaying an instruction message for the user to remove from the paper inserter unit any remaining sheets of the $n^{th}$ set of the first sub-document; (c3) starting a printing process on the second printer to print N-n sets of the second sub-document while merging the sheets of the first sub-document in the paper inserter unit with printed sheets of the second sub-document according to the predetermined merging order; (c4) determining a point of interruption of the $n^{th}$ set; (c5) identifying a first sheet of the first sub-document after the point of interruption; (c6) displaying an instruction message for the user to place printed sheets of the $n^{th}$ set of the first sub-document starting from the sheet identified in step (c5) in the paper inserter unit of the second printer; and (c7) starting a printing process on the second printer to print the $n^{th}$ set of the second sub-document starting from the point of interruption while merging the sheets of the $n^{th}$ set of the first sub-document in the paper inserter unit with printed sheets of the second sub-document according to the predetermined merging order.

In another aspect, the present invention provides a computer program product that causes a data processing apparatus to perform the above method.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 4:
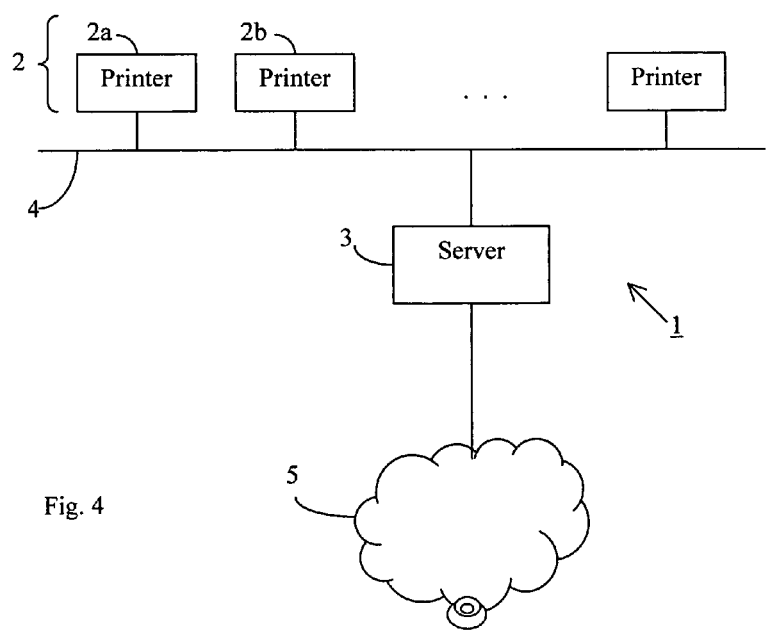
FIG. 4 schematically illustrates a print shop system having a plurality of printers connected to a server via a network in which methods according to embodiments of the present invention may be implemented.

FIG. 4 schematically shows a print shop system 1 having a plurality of printers 2a, 2b, . . . connected to a server (or any suitable data processing apparatus) 3 via a network 4. One or more user terminals (not shown) are also connected to the server to enable print shop operators to interact with the server and the rest of the system. The server 3 is preferably also connected to an external network 5 such as the Internet for receiving print jobs (i.e. print requests from customers and documents to be printed). The server 3, under control of print shop management software, receives print jobs from customers and submits print commands and data to be printed to one or more printers 2. The print shop management software may make various management decisions, such as which printer (s) to use for a print job, either automatically or under various degree of control of an operator.

When a document to be printed (herein after referred to as the source document) is a mixed color document, i.e. one that contains both color pages and black and white pages, the server 3 makes a determination as to whether to submit the entire print job (i.e. all pages of the source document) to one or more color printers, or to split the print job into two sub-jobs by submitting the color pages to one or more color printers and the black and white pages to one or more black and white printers. A method for determining whether to split a print job based on a cost calculation to minimize the total cost of printing the entire job is described in commonly owned, co-pending U.S. patent application Ser. No. 11/395, 583, filed Mar. 31, 2006, entitled "Print Shop Management Method and Apparatus for Printing Mixed Color and Black and White Documents". Another commonly owned, co-pending U.S. patent application entitled "Print Shop Management Method And Apparatus For Printing Mixed Color And Black And White Documents", describes another method for determining whether to split a print job into two sub-jobs that is especially useful in situations where N-up (multiple pages of the source document printed on one sheet of paper), duplex (2-sided printing), or mixed-size paper is involved.

If a print job is split into two sub-jobs and printed on a color printer and a black and white printer separately, the source document and the associated job ticket are processed to separate the color and black and white pages in the document so that they can be submitted to different printers. A job ticket, which is associated with the source document, specifies various parameters governing the printing of the document, such as the number of sets, orientation, input tray, output tray, finishing instructions (staple, hole punch, etc.), etc. Exemplary methods for splitting a job ticket into two sub-job tickets, one for color printing and one for black and white printing, are described in commonly owned, co-pending U.S. patent application Ser. No. 11/395,585, filed Mar. 31, 2006, entitled "Method for Printing Mixed Color and Black and White Documents", which is incorporated by reference herein in its entirety.

Figure 3:
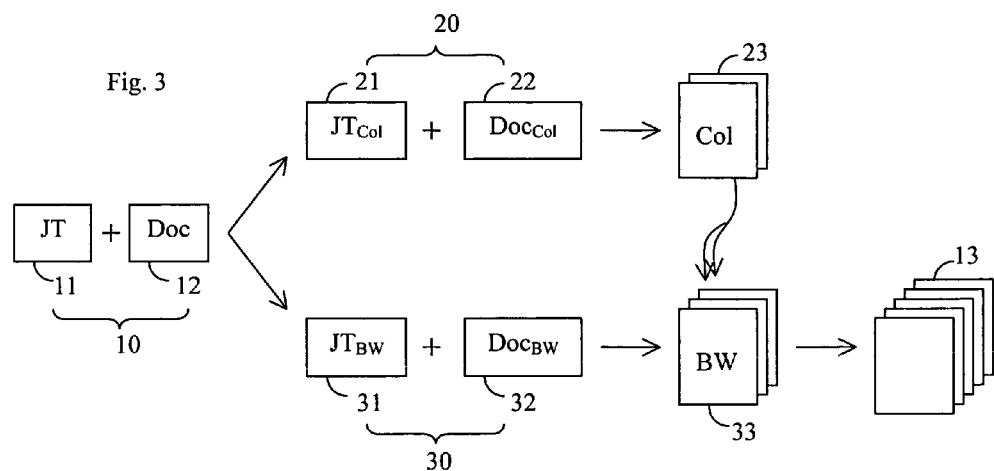
FIG. 3 schematically illustrates color split printing.

FIG. 3 schematically illustrates color split printing. As shown in FIG. 3, an original print job 10 includes a print request or job ticket 11, and a document to be printed 12. To accomplish split job printing, the original print job 10 is split into two sub-jobs, a color sub-job 20 and a black and white sub-job 30. The color sub-job 20 includes a color sub-job ticket 21 associated with a color sub-document 22, and the black and white sub-job 30 includes a black and white sub-job ticket 31 associated with a black and white sub-document 32. The color sub-job 20 is printed on a color printer according to the parameters in the color sub-job ticket to generate a color output 23, and the black and white sub-job 30 is printed on a black and white printer according to the parameters in the black and white sub-job ticket to generate a black and white output 33. The color output 23 and the black and white output 33 are merged or collated together according to the original page order of the source document 12, and finished according to the finishing instructions of the original job ticket 11 to produce a final printed document 13.

Merging or collating of outputs of two printers may be accomplished by using a paper inserter unit of one of the printers. A paper inserter unit, also called a collator, is a feeder in a printer that feeds the paper in it to the output tray of the printer, without printing on them, in a programmed order concurrently with the printing of another document by the printer. First, the first sub-document is printed on a first printer, and the output is transported to a paper inserter unit of a second printer. The second sub-document is then printed on the second printer. The pages in the paper inserter unit are merged with the concurrently printed pages of the second sub-document according to a programmed merging order. The merging order is pre-programmed into the second sub-job ticket as described in more detail in the above identified co-pending U.S. patent application Ser. No. 11/395,585.

In the example in FIG. 3, the color sub-document is shown as being printed first and merged into the black and white sub-document, but the black and white sub-document can be printed first and merged into the color sub-document. Preferably, the original job is split such that the printer having the finishing capabilities required by the original job will be the second printer, so that finishing can be done at the second printer after merging, without having to move the merged outputs to another finishing device. If both printers have the requisite finishing capabilities, then the original job is preferably split such that the sub-job having fewer pages is printed first and merged with the sub-job having more pages so as to reduce the time required to insert pages during merging.

As an alternative to a paper inserter unit of the second printer, a separate device may be used to merge two sets of already printed pages according to a programmed order. Such a device has two or more input units, and can be programmed to take pages from the various input units according to the programmed order to merge them into one set of pages.

In the color split printing process, interruptions such as paper jam, or other problems may occur. The present invention relates to methods for recovering from such interruptions, particularly when an interruption occurs during merging. If an interruption occurs when printing the first sub-job on the first printer, recovery is straightforward because no merging is being carried out. This is done by clearing the printer problem, resuming printing, and removing incorrectly printed or duplicate sheets. Most printers have the ability to resume printing at the appropriate point to ensure that a complete set is produced.

A method for recovering from an interruption during merging is now described with reference to FIGS. 1 and 2 and using the following example. Assume that the print job requires printing N sets of the document. N sets of the first sub-document have been completely printed on the first printer and the printed sheets have been placed in the paper inserter unit of the second printer. The second printer has been started to print the second sub-document and to merge the sheets of the first sub-document, but an interruption occurs during the printing and merging of the $n^{th}$ set of the document (where $n \leq N$). The recovery process described below is executed on the second printer; specifically, the process is governed a central processing unit (CPU) in the second printer, which executes a program stored in a non-volatile memory, such as a read only memory (ROM).

To recover from the interruption, the user first resolves the device problem (FIG. 1, step S11), such as clearing the paper jam, etc. The user then removes from the output tray of the second printer the already printed and merged sheets of the uncompleted $n^{th}$ set (step S12). The user may optionally remove the sheets of the n−1 sets of the document that have been successfully completed. The user also removes from the paper inserter unit the remaining sheets of the $n^{th}$ set of the first sub-document until the beginning of the next set is reached (step S13). The user may determine which sheet is the last sheet of the $n^{th}$ set by looking at the last sheet of the first sub-document in the paper inserter unit. Alternatively, the printer may display an image of the last sheet of the first sub-document on its display to assist the user in locating the last sheet of the $n^{th}$ set of the first sub-document. During the above process, the printer preferably displays messages to instruct the user to perform steps S11 through S13. The user then restarts printing and merging from beginning of the $(n+1)^{th}$ set (step S14). This may be done by pressing an appropriate key on the printer, preferable under the instruction of the printer. The printer is programmed to restart printing/merging from the beginning of the next set. Printing proceeds to completion (i.e. the printer prints N-n sets), at which point all N sets of the document except for the $n^{th}$ set are successfully printed. Next, the user completes the interrupted $n^{th}$ set (step S15) by performing a procedure shown in FIG. 2.

To complete the interrupted $n^{th}$ set, the user first places the sheets of the uncompleted $n^{th}$ set of the document (i.e. the sheets that were previously removed form the output tray in step S12) in the paper inserter unit of the second printer (step S21), and issues a command to resume (step S22). The printer feeds the sheets of the un-completed $n^{th}$ set through the paper inserter unit to count the number of sheets (step S23). Based on the number of sheets, and based on the information regarding the merging order of the two sub-documents which is available from the second sub-job ticket, the printer identifies the first sheet of the first sub-document after the point of interruption (step S24). This sheet is determined by the program to be the first sheet of the remaining portion of the first sub-document to be merged into the second sub-document. Then, the printer instructs the user to place the remaining portion of the first sub-document, starting from the identified sheet, in the paper inserter unit (step S25). This may be done by displaying an image of the identified sheet on the printer's display together with an instruction message. Normally, if the interruption did not cause any sheets of the first sub-document to be destroyed (for example, the paper jam occurred when printing a sheet of the second sub-document, not when merging a sheet of the first sub-document), then the portions of the first sub-document that the user previously removed from the paper inserter unit in step S13 will correctly begin with the identified sheet. If, on the other hand, a sheet of the first sub-document was destroyed by the interruption (for example, a paper jam occurred when feeding a sheet from the paper inserter unit and destroyed the sheet), then the user will need to re-print the destroyed sheet of the first sub-document using the first printer. After placing the remaining portion of the first sub-document in the paper inserter unit as instructed, the user issues a command for the printer to start printing (step S26). The printer resumes printing of the second sub-document from the point of interruption, merging the sheets of the first sub-document from the paper inserter unit, until the $n^{th}$ set of the document is completed (step S27). This completes the recovery process.

As an alternative to the counting steps S21 and S23, the second printer may be programmed to store information about the point of interruption, so that the printer can correctly identify the first sheet of the first sub-document after the point of interruption (step S24) without the counting steps S21 and S23.

It can be seen that the recovery method described above skips the interrupted $n^{th}$ set of the document and completes the $(n+1)^{th}$ to $N^{th}$ sets before returning to the $n^{th}$ set. An advantage of this process is that by restarting at the beginning of the next set, it can be ensured that the $(n+1)^{th}$ to $N^{th}$ sets are correctly printed and merged. Thus, even if the operator makes an error when restarting the interrupted set, such as by placing incorrect sheets of the first sub-document in the paper inserter unit, the error will only affect the $n^{th}$ set.

Figure 1:
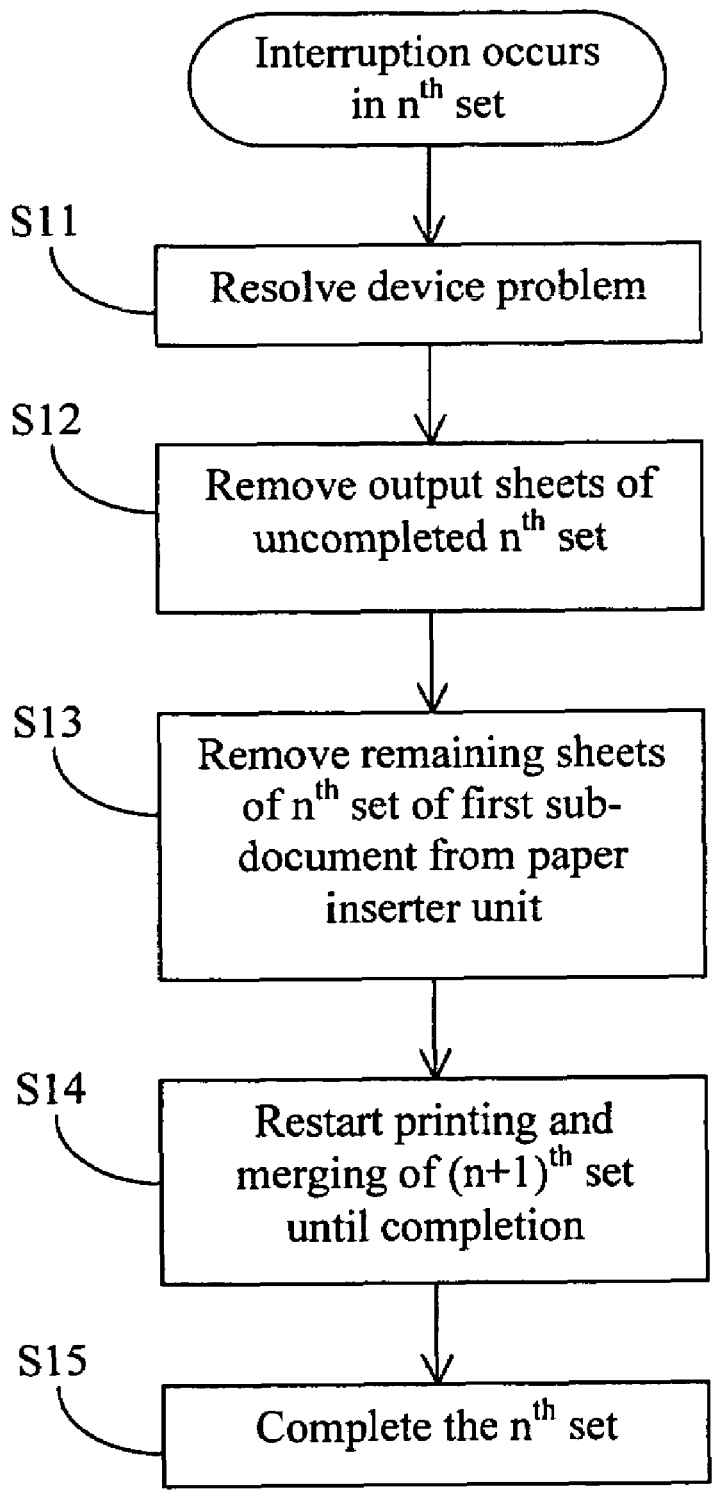
FIGS. 1 and 2 illustrate a method for recovering from an interruption during color split printing according to an embodiment of the present invention.
Figure 2:
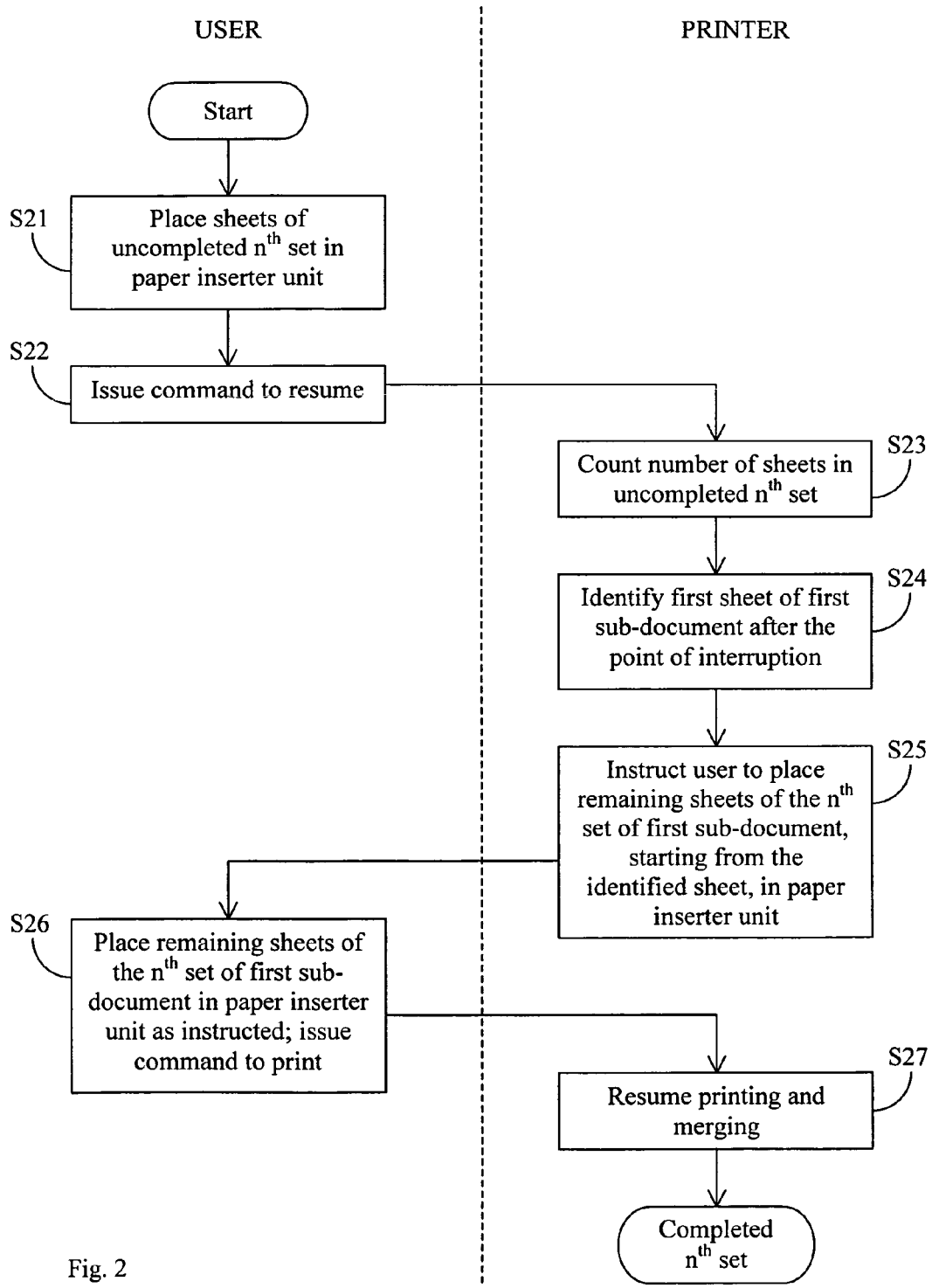

Of course, if only one set of the document is being printed, or if the interruption occurs during printing of the last set, then step S14 in FIG. 1 will not be necessary.

The recovery method described above may be implemented by software, firmware or hardware, and may be implemented either on the printer that performs the merging operation or on the server. If implemented on the server, the server will cause the printer to display the various instructions to the user.

The recovery method described above can be applied any time when printing involves merging two sub-documents together. Although color split is used in the above description as an example, the applications are not limited to color split.

While the embodiments have been described as being applied in a print shop environment, the invention is not limited to any physical setting of a shop, and can be applied to a print shop system having a distributed setting where printers at different locations are connected to a server.

It will be apparent to those skilled in the art that various modification and variations can be made in the print shop management method and apparatus of the present invention without departing from the spirit or scope of the invention. Thus, it is intended that the present invention cover modifications and variations that come within the scope of the appended claims and their equivalents.

What is claimed is:

1. A method for printing N sets of a source document, N being a natural number, the source document having been split into a first sub-document and a second sub-document, the method comprising:
   (a) printing on a first printer N sets of the first sub-document;
   (b) placing printed sheets of the N sets of the first sub-document in a paper inserter unit of a second printer;
   (c) starting a printing process on the second printer to print N sets of the second sub-document while merging the sheets of the first sub-document in the paper inserter unit with printed sheets of the second sub-document according to a predetermined merging order;

(d) when an interruption occurs in the printing step (c) during printing of an $n^{th}$ set of the second sub-document, n being a natural number and $n \leq N$, performing a recovery process including:

(d1) removing from the second printer already printed and merged sheets of the n set;

(d2) removing from the paper inserter unit any remaining sheets of the $n^{th}$ set of the first sub-document;

(d3) starting a printing process on the second printer to print N-n sets of the second sub-document while merging the sheets of the first sub-document in the paper inserter unit with printed sheets of the second sub-document according to the predetermined merging order;

(d4) determining a point of interruption of the $n^{th}$ set;

(d5) identifying a first sheet of the first sub-document after the point of interruption;

(d6) placing printed sheets of the $n^{th}$ set of the first sub-document starting from the sheet identified in step (d5) in the paper inserter unit of the second printer; and (d7) starting a printing process on the second printer to print the $n^{th}$ set of the second sub-document starting from the point of interruption while merging the sheets of the $n^{th}$ set of the first sub-document in the paper inserter unit with printed sheets of the second sub-document according to the predetermined merging order.

2. The method of claim 1, wherein step (d4) includes:

(d8) placing in the paper inserter unit the already printed and merged sheets of the $n^{th}$ set that were removed in step (d1);

(d9) counting the sheets in the paper inserter unit by feeding them through the paper inserter unit; and (d10) based on a counting result of step (d9), determining the point of interruption of the $n^{th}$ set.

3. The method of claim 1, further including: after step (d5), displaying an image of the first sheet of the first sub-document after the point of interruption on a display device.

4. The method of claim 1, wherein one of the first and second sub-documents is a color sub-document and printed on a color printer and the other one is a black and white sub-document and printed on a black and white printer.

5. A method for producing N sets of a source document, N being a natural number, the source document having been split into a first sub-document and a second sub-document, the N sets of the first sub-document having been printed on a first printer, the method comprising:

(a) displaying an instruction message for a user to place printed sheets of the N sets of the first sub-document in a paper inserter unit of a second printer;

(b) starting a printing process on the second printer to print N sets of the second sub-document while merging the sheets of the first sub-document in the paper inserter unit with printed sheets of the second sub-document according to a predetermined merging order;

(c) when an interruption occurs in the printing step (b) during printing of an $n^{th}$ set of the second sub-document, n being a natural number and $n \leq N$, performing a recovery process including:

(c1) displaying an instruction message for the user to remove from the second printer already printed and merged sheets of the $n^{th}$ set;

(c2) displaying an instruction message for the user to remove from the paper inserter unit any remaining sheets of the $n^{th}$ set of the first sub-document;

(c3) starting a printing process on the second printer to print N-n sets of the second sub-document while merging the sheets of the first sub-document in the paper inserter unit with printed sheets of the second sub-document according to the predetermined merging order;

(c4) determining a point of interruption of the $n^{th}$ set;

(c5) identifying a first sheet of the first sub-document after the point of interruption;

(c6) displaying an instruction message for the user to place printed sheets of the $n^{th}$ set of the first sub-document starting from the sheet identified in step (c5) in the paper inserter unit of the second printer; and (c7) starting a printing process on the second printer to print the $n^{th}$ set of the second sub-document starting from the point of interruption while merging the sheets of the $n^{th}$ set of the first sub-document in the paper inserter unit with printed sheets of the second sub-document according to the predetermined merging order.

6. The method of claim 5, wherein step (c4) includes:

(c8) displaying an instruction message for the user to place in the paper inserter unit the already printed and merged sheets of the $n^{th}$ set;

(c9) counting the sheets in the paper inserter unit by feeding them through the paper inserter unit; and (c10) based on a counting result of step (c9), determining the point of interruption of the $n^{th}$ set.

7. The method of claim 5, wherein step (c6) includes displaying an image of the first sheet of the first sub-document after the point of interruption on a display device.

8. The method of claim 5, wherein one of the first and second sub-documents is a color sub-document and printed on a color printer and the other one is a black and white sub-document and printed on a black and white printer.

9. A computer program product comprising a computer usable medium having a computer executable program code embedded therein for controlling a data processing apparatus, the computer executable program code configured to cause the data processing apparatus to execute a process for producing N sets of a source document, N being a natural number, the source document having been split into a first sub-document and a second sub-document, the N sets of the first sub-document having been printed on a first printer, the process comprising:

(a) displaying an instruction message for a user to place printed sheets of the N sets of the first sub-document in a paper inserter unit of a second printer;

(b) starting a printing process on the second printer to print N sets of the second sub-document while merging the sheets of the first sub-document in the paper inserter unit with printed sheets of the second sub-document according to a predetermined merging order;

(c) when an interruption occurs in the printing step (b) during printing of an $n^{th}$ set of the second sub-document, n being a natural number and $n \leq N$, performing a recovery process including:

(c1) displaying an instruction message for the user to remove from the second printer already printed and merged sheets of the $n^{th}$ set;

(c2) displaying an instruction message for the user to remove from the paper inserter unit any remaining sheets of the $n^{th}$ set of the first sub-document;

(c3) starting a printing process on the second printer to print N-n sets of the second sub-document while merging the sheets of the first sub-document in the paper inserter unit with printed sheets of the second sub-document according to the predetermined merging order;

(c4) determining a point of interruption of the $n^{th}$ set;

(c5) identifying a first sheet of the first sub-document after the point of interruption;

(c6) displaying an instruction message for the user to place printed sheets of the $n^{th}$ set of the first sub-document starting from the sheet identified in step (c5) in the paper inserter unit of the second printer; and (c7) starting a printing process on the second printer to print the $n^{th}$ set of the second sub-document starting from the point of interruption while merging the sheets of the $n^{th}$ set of the first sub-document in the paper inserter unit with printed sheets of the second sub-document according to the predetermined merging order.

10. The computer program product of claim 9, wherein step (c4) includes:

(c8) displaying an instruction message for the user to place in the paper inserter unit the already printed and merged sheets of the $n^{th}$ set;

(c9) counting the sheets in the paper inserter unit by feeding them through the paper inserter unit; and (c10) based on a counting result of step (c9), determining the point of interruption of the $n^{th}$ set.

11. The computer program product of claim 9, wherein step (c6) includes displaying an image of the first sheet of the first sub-document after the point of interruption on a display device.

12. A method for printing N sets of a source document, N being a natural number, the source document having been split into a first sub-document and a second sub-document, the method comprising:

(a) printing on a first printer N sets of the first sub-document;

(b) placing printed sheets of the N sets of the first sub-document in a paper inserter unit of a second printer;

(c) starting a printing process on the second printer to print N sets of the second sub-document while merging the sheets of the first sub-document in the paper inserter unit with printed sheets of the second sub-document according to a predetermined merging order;

(d) when an interruption occurs in the printing step (c) during printing of an $n^{th}$ set of the second sub-document, n being a natural number and $n \leq N$, performing a recovery process including:

(d1) removing from the second printer already printed and merged sheets of the $n^{th}$ set;

(d2) removing from the paper inserter unit any remaining sheets of the $n^{th}$ set of the first sub-document;

(d3) starting a printing process on the second printer to print N-n sets of the second sub-document while merging the sheets of the first sub-document in the paper inserter unit with printed sheets of the second sub-document according to the predetermined merging order; and (d4) after finishing printing the N-n sets in step (d3), starting a printing process on the second printer to complete the $n^{th}$ set of the second sub-document while merging the sheets of the $n^{th}$ set of the first sub-document in the paper inserter unit with printed sheets of the second sub-document according to the predetermined merging order.

13. The method of claim 12, wherein step (d4) comprises:

(d5) placing in the paper inserter unit the already printed and merged sheets of the $n^{th}$ set that were removed in step (d1);

(d6) counting the sheets in the paper inserter unit by feeding them through the paper inserter unit; and (d7) based on a counting result of step (d6), determining the point of interruption of the $n^{th}$ set;

(d8) identifying a first sheet of the first sub-document after the point of interruption;

(d9) placing printed sheets of the $n^{th}$ set of the first sub-document starting from the sheet identified in step (d8) in the paper inserter unit of the second printer; and (d10) starting a printing process on the second printer to print the $n^{th}$ set of the second sub-document starting from the point of interruption while merging the sheets of the $n^{th}$ set of the first sub-document in the paper inserter unit with printed sheets of the second sub-document according to the predetermined merging order.

14. The method of claim 12, wherein one of the first and second sub-documents is a color sub-document and printed on a color printer and the other one is a black and white sub-document and printed on a black and white printer.

* * * * *